United States Patent [19]
Kukes et al.

[11] 3,786,994
[45] Jan. 22, 1974

[54] ADAPTOR UNIT FOR USE WITH FLUID NOZZLES

[75] Inventors: Charles E. Kukes, Glendale;
Richard H. Volheim, Los Angeles;
Carl Erikson, Glendale, all of Calif.

[73] Assignee: Alan Scott, Los Angeles, and Charles E. Kukes, Glendale, both of Calif.; a part interest to each

[22] Filed: July 27, 1972

[21] Appl. No.: 275,795

[52] U.S. Cl.................. 239/569, 137/223, 141/38
[51] Int. Cl............................................. F16k 15/20
[58] Field of Search...... 239/569, 570, 571; 141/38, 141/384, 387, 349; 137/223; 152/427, 428

[56] References Cited
UNITED STATES PATENTS

| | | | |
|---|---|---|---|
| 3,074,457 | 1/1963 | Tubbs | 152/427 |
| 2,359,162 | 9/1944 | Sherbondy | 137/223 X |
| 2,844,182 | 7/1958 | Hall | 152/427 |
| 1,452,284 | 4/1923 | Steinmetz | 152/428 |
| 1,492,838 | 5/1924 | Dilweg | 141/38 X |
| 2,482,922 | 9/1949 | Marcum | 137/223 |
| 2,939,478 | 6/1960 | Dockrell | 137/223 |

*Primary Examiner*—Allen N. Knowles
*Assistant Examiner*—Michael Y. Mar
*Attorney, Agent, or Firm*—Herzig & Walsh

[57] ABSTRACT

An adaptor unit adapted for sealing connection with a fluid nozzle, particularly, an air nozzle to provide connection between it and a tubular extension fitting having an air nozzle at the end particularly adapted for reaching into the valve stem of the inner of a pair of dual tires.

7 Claims, 4 Drawing Figures

PATENTED JAN 22 1974   3,786,994
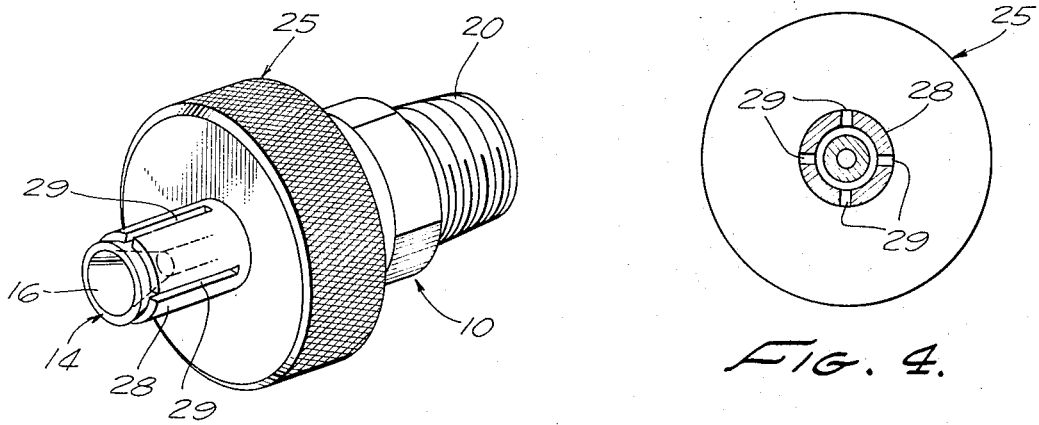
FIG. 1.
FIG. 4.
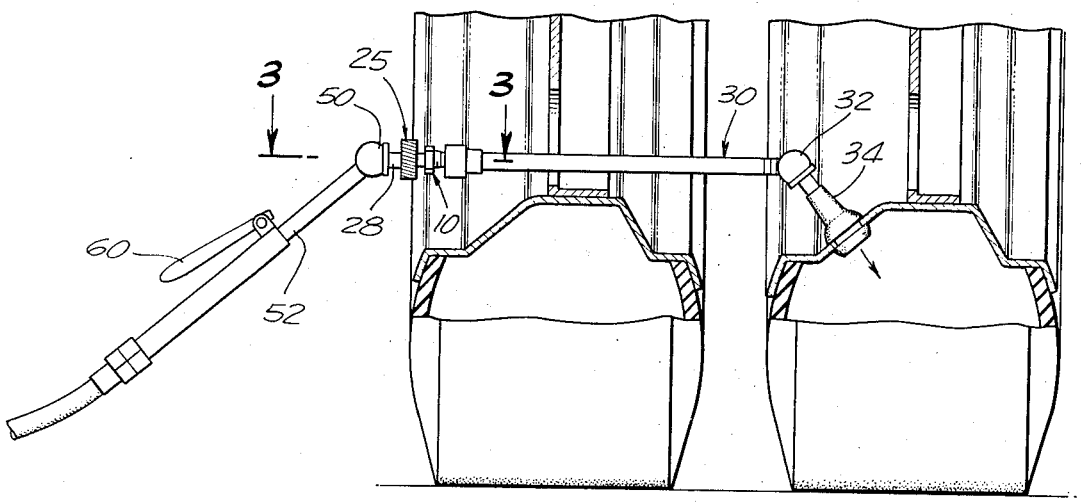
FIG. 2.
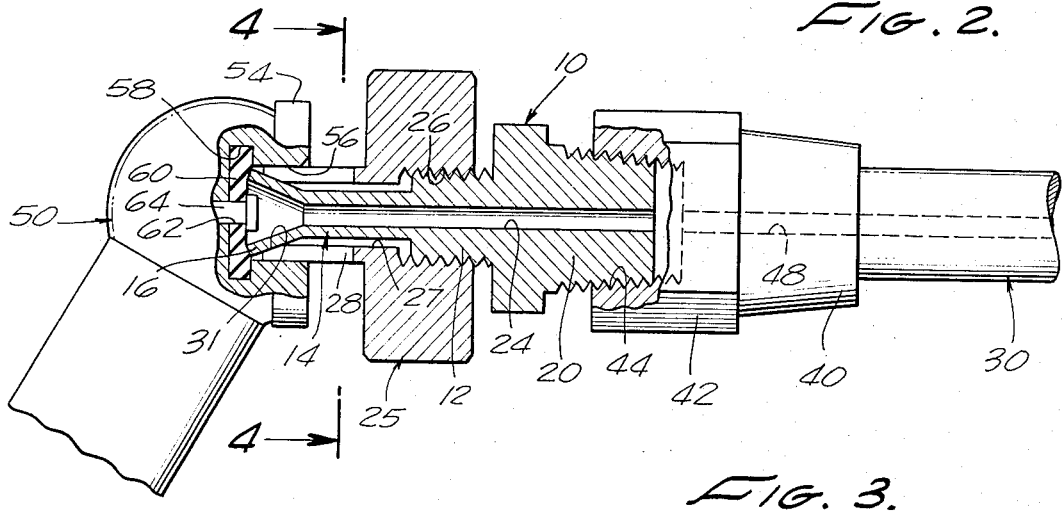
FIG. 3.

ADAPTOR UNIT FOR USE WITH FLUID NOZZLES

SUMMARY OF THE INVENTION

The invention as described in detail herein is an adaptor unit adapted for sealing connection and securement to the nozzle on the end of an air line. The adaptor means connects the air nozzle to a tubular extension or fitting which itself has an air nozzle on the end adapted to be fitted onto the end of a valve stem on the inner of a pair of dual side-by-side tires.

BACKGROUND OF THE INVENTION

Many large trucks and large vehicles in use contemporarily have dual side-by-side tires. Requisite air pressures must be maintained in the tires. In order to put air into the inside tire of the dual side-by-side tires there is required a special extending fitting with a nozzle at the end which can be extended through the outside wheel to the valve stem on the inner tire. Typically, this fitting may be about eight inches long with an air nozzle on the end. This fitting is rigid.

Typically, only truck stops have or are equipped with this particular extendible fitting with nozzle for reaching into the valve of the inner wheel. In regular stations, the air line is not equipped with this extended fitting at the end and the trucker is unable to put air into the inner tire. He neglects to do so when the air pressure in these tires is low.

It is the primary object of the invention to provide means in the form of an article whereby the above problem and deficiency is overcome. The means or article is in the form of an adaptor unit which is connected to and can carry the extended fitting and which can be quickly sealingly secured and connected to the nozzle at the end of the air line as available at regular filling stations. Thus, the trucker can be equipped with his own extended nozzle fitting and the adaptor means of the invention can quickly couple it to any standard air line nozzle. He is then able to put air into the inside tires of the dual tire assemblies. The realization of this result and purpose is an object of the invention.

In the preferred exemplary form of the invention as described herein, it takes the form of a body carrying a movable chuck. The body has a part with a flared end within the chuck which can be extended into the air nozzle. The chuck is extended against the flared end to tightly engage within the air nozzle.

While the exemplary form of the invention is for use with air nozzles, it is to be understood that it might be used as well with other types of fluid nozzles and outlets.

BRIEF DESCRIPTION OF THE DRAWINGS

Further objects and additional advantages of the invention will become apparent from the following detailed description and annexed drawings, wherein:

FIG. 1 is a perspective view of a preferred form of the invention;

FIG. 2 is a schematic sectional view of a pair of dual tires illustrating use of the adaptor of the invention in applying air pressure to the inner tire;

FIG. 3 is a sectional view taken long the line 3—3 of FIG. 2; and

FIG. 4 is a sectional view taken along the line 4—4 of FIG. 3.

DESCRIPTION OF THE PREFERRED EMBODIMENT

Referring to the drawings, the adaptor means in the exemplary form shown comprises a body 10 which is cylindrical having an extending threaded cylindrical boss part 12 which has an extended cylindrical stem 14, the end part of which is flared as shown at 16. Body 10 also has an extending tapered threaded boss part 20. Body 10 has a central bore 24 extending completely through it.

Numeral 25 designates a cylindrical rotor member having a threaded bore 26 and a counterbore 27 in an extending part 28 which constitutes the chuck. The chuck is expansible, having equal angularly spaced slots 29 as may be seen in the figures. The inner stem 14 is telescoped within chuck 28. The inside end part of chuck 28 has a slight taper 31 as shown which engages against the outside of flared end part 16.

Numeral 30 designates a tubular fitting having a central bore and having at one end a typical air nozzle 32 adapted to fit over a valve such as the valve stem 34 on the inner tire of the dual tires shown in FIG. 2. At the end of fitting 30 there is a tapered part 40 which is part of an internally threaded coupling member or fitting 42 having a bore 44 which receives threaded boss 20 of body 10. Fitting 30 has a bore 48.

Numeral 50 designates a typical head or nozzle on the end of an air line 52. The head or nozzle has an end flange 54. It has a bore 56 at the inner end of which is an enlarged bore 58 having in it a flexible sealing member 60 having a central aperture 62 through which extends the valve stem 64 within head or nozzle 50.

FIGS. 2 and 3 show the adaptor means secured or coupled to the head 50. Extended fitting 30 is attached to the adaptor means by coupling members 20 and 42. To connect or couple the adaptor means to head 30, end 16 of stem 14 is inserted in bore 56 of head 50. The flared end is pressed against the flexible pad or seal member 60 as shown. The chuck 28 is on the outside of stem 14. Knurled rotor 25 can then be rotated on its threads relative to body 10 causing chuck 28 to more axially into bore 56 and against the outside of flare 16 so that the end of chuck is expanded to come into tight secure holding engagement within bore 56 of head 50. The connection or securement having been made, the parts are as shown in the figures. Fitting 30 can readily be extended through the outside wheel to bring head or nozzle 32 into engagement with the end of valve stem 34 for admitting air pressure to the inner tire. Air line 50 may be a typical one with manual valve control handle 60 for causing air to be admitted.

From the foregoing, those skilled in the art will readily understand the nature of the construction of the invention and the manner in which it achieves and realizes the objects and advantages as set forth in the foregoing. The adaptor means may be readily coupled to the head or nozzle at the end of any air line. The threaded coupling connection with the attendant nozzle member 30 can very readily be made. The trucker can of course be equipped with the extended nozzle fitting and with the adaptor means possesses a capability to inflate the inner tire of dual tires in any regular filling station.

The foregoing disclosure is representative of a preferred form of the invention and is to be interpreted in an illustrative rather than a limiting sense. The invention is to be accorded the full scope of the claims appended hereto.

What is claimed is:

1. As an article of manufacture, adaptor means adapted to be sealingly connected to a fluid nozzle whereby to accommodate a fitting adapted for delivering fluid to another point, said adaptor means comprising: a body having a part extendible into the fluid nozzle; means comprising a chuck means carried by the body and movable relative thereto whereby to produce a secure coupling and sealing engagement with the nozzle whereby the fluid may be delivered to the adaptor means and fitting.

2. An article as in claim 1, wherein said chuck means and said body have threaded engagement whereby relative rotation causes said chuck means to advance into said nozzle.

3. An article as in claim 2, wherein said adaptor means has threaded engagement with said fitting.

4. An article as in claim 1, wherein said fitting has a fluid nozzle on the end adapted to engage the end of a valve stem.

5. An article as in claim 4, wherein said fitting is of sufficient length that it can be extended through the outside of one of a pair of dual tires so as to reach the valve stem on the inner of the tires.

6. As an article of manufacture, adaptor means adapted to be sealingly connected to a fluid nozzle whereby to accommodate a fitting adapted for delivering fluid to another point, said adaptor means comprising: a body having a part extendible into the fluid nozzle; means comprising a chuck means carried by the body and movable relative thereto whereby to produce a secure sealing engagement with the nozzle whereby the fluid may be delivered to the adaptor means and fitting, said chuck means being expandible whereby to be expanded within said nozzle to securely engage therewithin.

7. An article as in claim 6, wherein said extending part is flared, being telescoped within said chuck means, said chuck means being movable relative to the flared part to be expanded thereby.

* * * * *